United States Patent [19]

Deiotte

[11] Patent Number: 4,791,623
[45] Date of Patent: Dec. 13, 1988

[54] FILE MANAGEMENT SYSTEM FOR USE IN AN OPTICAL DATA STORAGE SYSTEM

[75] Inventor: Charles E. Deiotte, Colorado Springs, Colo.

[73] Assignee: Optotech, Inc., Colorado Springs, Colo.

[21] Appl. No.: 847,484

[22] Filed: Apr. 3, 1986

[51] Int. Cl.⁴ .......................... G11B 5/76; G11B 5/09
[52] U.S. Cl. .......................................... 369/59; 360/48
[58] Field of Search ............... 369/47, 48, 59; 360/48, 360/49

[56] References Cited

U.S. PATENT DOCUMENTS 4,682,318 7/1987 Busby .................................... 369/59

Primary Examiner—Vincent P. Canney
Attorney, Agent, or Firm—Kinney & Lange

[57] ABSTRACT

A file management system for interfacing a host computer application or operating system to a write once read mostly optical data storage system. The file management system causes a predetermined number of sectors on the optical disk to be reserved for a directory region, and causes files of information data to be written to consecutive sectors of an information region adjacent the directory region. Directory data associated with the files of information data is then written to consecutive sectors in the directory region. The information region is thereby allowed to expand to any necessary size until directory data associated therewith fills the adjacent directory region. These procedures are then repeated, resulting in a plurality of interleaved directory and information regions on the optical disk. The file management system causes directory data to be organized in a tree structure. Each file of information data is associated with a subdirectory. For each current file of information data written to the optical disk, the file management system causes directory data including a subdirectory record and a root record to be written. The subdirectory record contains data identifying the location in the information regions of all files associated with the subdirectory to which the current file was just written. The root record contains data identifying the location in the directory data regions of all subdirectory records.

64 Claims, 4 Drawing Sheets

ROOT RECORD HEADER
ROOT RECORD HEADER IDENTIFIER
ROOT NAME
NEXT AVAILABLE SECTOR FOR INFORMATION DATA
NEXT AVAILABLE SECTOR FOR DIRECTORY DATA

*Fig. 9*

ROOT LISTING
ROOT LISTING IDENTIFIER
SUBDIRECTORY NAME
STARTING SECTOR OF SUBDIRECTORY RECORD
LENGTH OF SUBDIRECTORY RECORD

*Fig. 10*

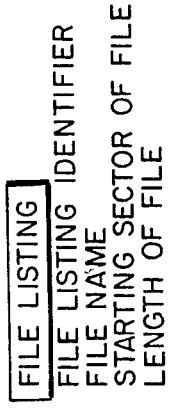

TRAILER
TRAILER IDENTIFIER
STARTING SECTOR OF CURRENT DIRECTORY REGION
STARTING SECTOR OF NEXT DIRECTORY REGION

*Fig. 11*

BOOT RECORD
STARTING TRACK FOR DIRECTORY
STARTING SECTOR FOR DIRECTORY
ENDING TRACK FOR DIRECTORY
ENDING SECTOR FOR DIRECTORY

*Fig. 6*

SUBDIRECTORY RECORD HEADER
SUBDIRECTORY RECORD HEADER IDENTIFIER
SUBDIRECTORY NAME
NEXT AVAILABLE SECTOR FOR INFORMATION DATA
NEXT AVAILABLE SECTOR FOR DIRECTORY DATA

*Fig. 7*

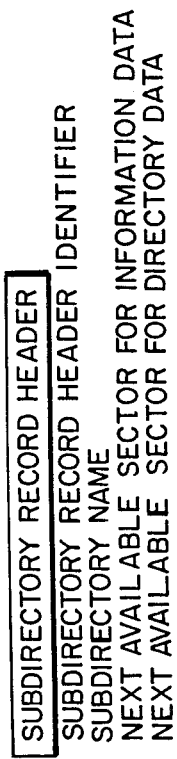

FILE LISTING
FILE LISTING IDENTIFIER
FILE NAME
STARTING SECTOR OF FILE
LENGTH OF FILE

*Fig. 8*

FILE MANAGEMENT SYSTEM FOR USE IN AN OPTICAL DATA STORAGE SYSTEM

BACKGROUND OF THE INVENTION

1. Field of the Invention

The present invention relates to optical data storage systems. In particular, the present invention is a file management system for interfacing a host computer to an optical data storage system.

2. Description of the Prior Art

Along with the computer came the need for high speed and high density digital information storage and retrieval systems. Magnetic disk drive systems, including both hard and flexible (floppy) disks were developed to meet these requirements. Magnetic disk drive systems of these types are currently in widespread use, and are well known.

The decreasing costs and increasing performance of semiconductor lasers has stimulated interest in the development of optical data storage systems. While these systems are conceptually very similar to magnetic information storage systems, component and media characteristics (e.g., optical transducers and storage disks as opposed to magnetic transducers and storage disks) of optical data storage systems are considerably different.

Magnetic and optical data storage systems typically include a controller which interfaces the host computer to the data storage system. The controller receives commands and data from, and provides status and data to, the host computer. In response to the commands, the data storage system controller provides signals which control the writing of data to and reading of data from the data storage disk.

Included within memory of the host computer is a disk operating system or file management system which interfaces file commands of a user (e.g., through user programs) and the commands recognized by the controller of the data storage system. Tasks performed by the file management system include keeping a directory of the location of all files of information data on the storage disk, and keeping track of remaining free space on the disk. In magnetic data storage systems, data written to the magnetic disk can be erased and rewritten, and therefore updated. The file management system therefore causes directory data to be written to predetermined locations on the magnetic disk. As files of information data are added to the magnetic disks, the file management system simply adds directory data to the reserve directory region. If a previously written file is updated, the file management system can erase and update previously written directory data.

Due to the characteristics of optical data storage systems, the file management systems typically used with magnetic data storage systems are incapable of interfacing the host computer to an optical disk drive. As a result, a separate file management system must be included within the host computer for this purpose. In write once read mostly optical disk drive systems, for example, data can only be written once to any location on the optical disk. Directory data cannot, therefore, be updated are previously written locations. Each time one or more new files of information data is written to the optical disk of the write once read mostly optical data storage system, the file management system must write directory data associated with these files at a new location on the optical disk.

In one prior art technique, files of information data are written to sequential sectors on the optical disk starting at an outer edge of the disk. An information region is therefore created on an outer portion of the disk, and expands inward as information data is written thereto. Directory data is written to sequential sectors of the optical disk beginning with sectors on an inner edge of the optical disk. A directory region is therefore created on an inner portion of the disk, and expands outward as directory data is written thereto. The disk is filled when the directory and information data meet. Since the directory data can be physically located at a point on the optical disk which is distant from the information data, the access time, or time acquired to write data to and read data from the optical disk, is relatively high. This file management system therefore reduces overall system performance.

Consequently, there is a continuing need for improved file management systems for optical data storage systems. A file management system which causes directory data to be written to directory data regions on the optical disk which are physically located near the information data regions would be desirable. Access time could thereby be reduced, increasing overall system performance. The file management system should also write directory data in a form which enables all previous versions of updated files to be found. Space on the optical disk could also be more efficiently utilized if directory data was written in such a form that only directory data to just written groups of files need be written.

SUMMARY OF THE INVENTION

The present invention is a method for writing files of information data, and directory data thereto, to an optical disk. After receiving a first directory region, one or more files of information data are written to a first information region. Directory data associated with the files of information data written to the first information region are then written to the first directory region. A second directory region is then reserved. One or more files of information data are then written to a second information region. Directory data associated with the files of information data written to the second information region is written to the second directory region.

In a preferred embodiment, a first directory region of a predetermined number of addressed sectors is reserved. Files of information data are written to consecutive addressed sectors in a first information region which is adjacent to the first directory region. Files of information data are written to the first information region until the first directory region is filled with directory data associated therewith.

In still other embodiments, each file of information data written to an information region is associated with a subdirectory. Direct data including a current subdirectory record is written to a directory region after each group of one or more files of information data is written to an information region. Each current subdirectory record includes information representative of a location within one of the information regions of each file of information data associated with the subdirectory to which the just written group of one or more files of information data is associated. A current root record is also written to a directory region after each group of one or more files of information data is written to an information region. Each current root record includes information representative of a location within one of the directory regions of each current subdirectory record.

The file management system causes a plurality of interleaved information and directory regions to be created on the optical disk. Access time can thereby be reduced, increasing system performance. The method by which file management system writes directory data permits all previous versions of an updated file to be accessed. Furthermore, only directory data for a subdirectory with which the just written file is associated need be written. The file management system therefore efficiently uses space on the optical disk.

BRIEF DESCRIPTION OF THE DRAWINGS

FIG. 6 describes information written to the boot record of a directory region such as that shown in FIG. 5.

FIG. 7 describes information written to a subdirectory header of a subdirectory record such as that shown in FIG. 5.

FIG. 8 describes information written to file listings of a subdirectory record such as that shown in FIG. 5.

FIG. 9 describes information written to a root record header of a root record such as that shown in FIG. 5.

FIG. 10 describes information written to root listings of a root record such as that shown in FIG. 5.

FIG. 11 describes information written to trailers of a directory data region such as that shown in FIG. 5.

DETAILED DESCRIPTION OF THE PREFERRED EMBODIMENTS

Figure 1:
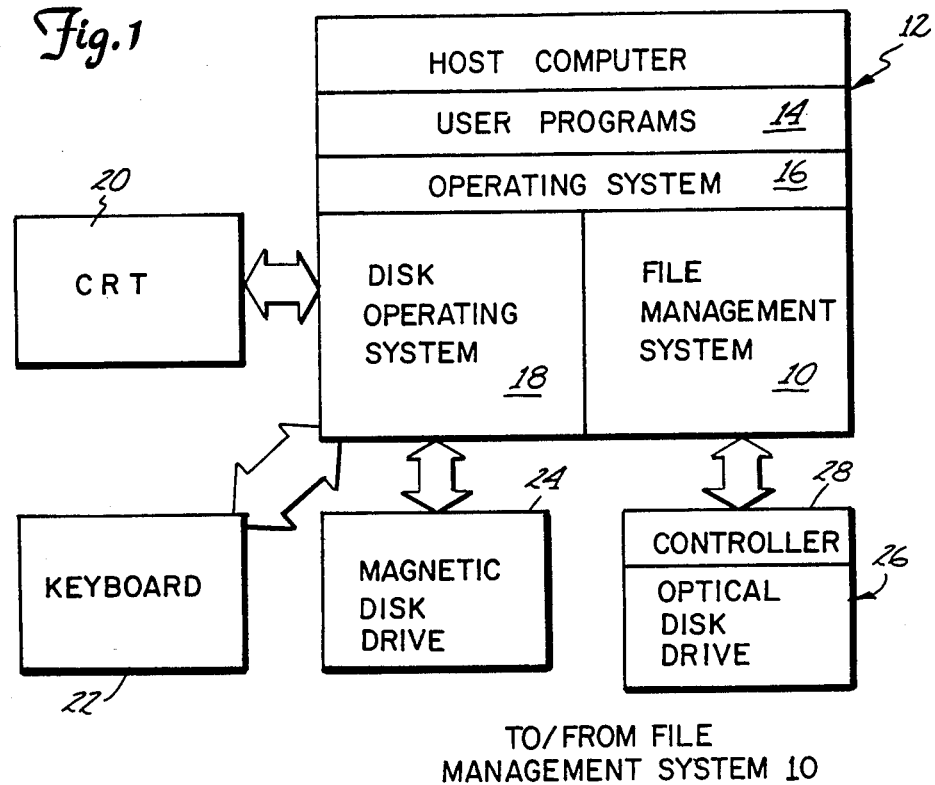
FIG. 1 is a block diagram representation of a host computer, including a file management system of the present invention, interfaces to a plurality of peripheral devices including an optical disk drive.

The present invention is a file management system for interfacing a host computer application or operating system to an optical data storage system or disk drive. The architectural organization of a host computer 12 is illustrated generally in FIG. 1. As shown, host computer 12 will typically include user programs 14, an operating system 16, and a disk operating system 18. Peripheral devices such as a visual display screen or CRT 20, keyboard 22, and magnetic disk drive 24 are typically interfaced to host computer 12 through disk operating system 18. Disk operating systems such as 18 are well known and commonly available.

When processing data with host computer 12, an operator or user will typically work with user programs 14 which are written in a high level language such as BASIC. A translator such as an assembler or compiler (not shown) translates the user programs into machine language, or 1s and 0s, for execution by computer 12. All of these operations are under the supervision and control of operating system 16, which is typically stored within computer memory. These features of computer 12 are well known.

Also shown in FIG. 1 is an optical data storage system such as optical disk drive 26. Associated with optical disk drive 26 is a controller 28 through which the drive is interfaced to host computer 12. Controller 28 receives command and data signals from computer 12, and provides control signals to various elements of optical disk drive 26 in response, thereby controlling read and write operations. Controller 28, in return, provides status signals and data to computer 12. Due to various characteristics of optical disk drive 26, the disk operating system 18 typically found in host computer 12 is inadequate to interface operating system 16 to optical disk drive 26. As a result, a separate file management system 10 is included within host computer 12 for this purpose.

Figure 2:
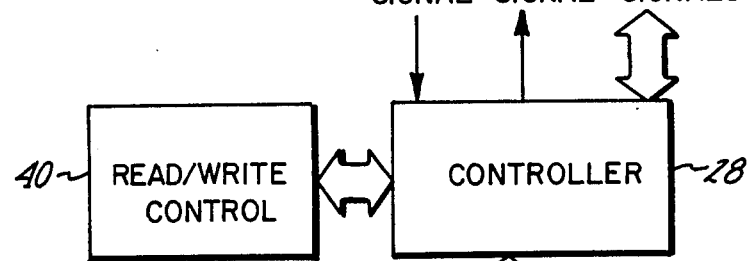
FIG. 2 is a block diagram representation of the optical disk drive shown in FIG. 1.
Figure 2:
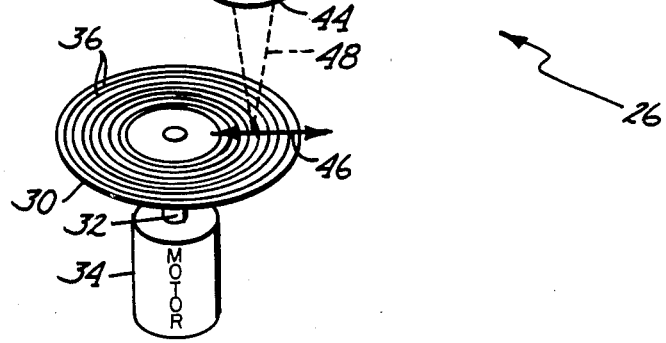

Optical disk drive 26 is illustrated in greater detail in FIG. 2. As shown in FIG. 2, optical disk drive 26 includes an optical record carrier or disk 30 which is mounted to spindle 32 and rotated about a rotational axis by motor 34. Positioned on a recording surface of optical disk 30 are a plurality of arcuate servo tracks 36. In addition to controller 28, optical disk drive 26 includes an optical head 38 with an objective lens 44, read/write control 40, and tracking control 42.

Controller 28 is connected to receive command signals from, and to provide status signals to, file management system 10. A write data signal representative of data to be written to optical disk 30 is also received by controller 28 from file management system 10. A read data signal which is representative of data read from optical disk 30 is provided to file management system 10 by controller 28. Controller 28 processes the received command signals, and produces tracking command signals which are supplied to tracking control 42, and read/write command signals which are supplied to read/write control 40. In response to the tracking command signals, tracking control 42 produces tracking control signals which are supplied to optical head 38, thereby causing optical head 38 and/or objective lens 44 to be driven along tracking axis 46 to specified servo tracks 36 at which it is desired to read data from or write data to optical disk 30.

In response to read/write command signals received from controller 28, read/write control 40 produces read and write control signals which are applied to optical head 38. The write control signals cause optical head 38 to produce a beam of radiation 48 at a write intensity level as a function of the write data signals, and thereby write data to precise locations on individual servo tracks 36. When read control signals are produced by read/write control 40, optical head 38 produces beam of radiation 48 at a read intensity level. Modulated radiation representative of data previously written to optical disk 30 is then collected by objective lens 44, and converted to signals represenative thereof by detector apparatus (not shown) within optical head 38. The electric signal represenative of data read from optical disk 30 applied to controller 28 through read/write control 40 from, which it is output to file management system 10 as the read data signal.

Figure 3:
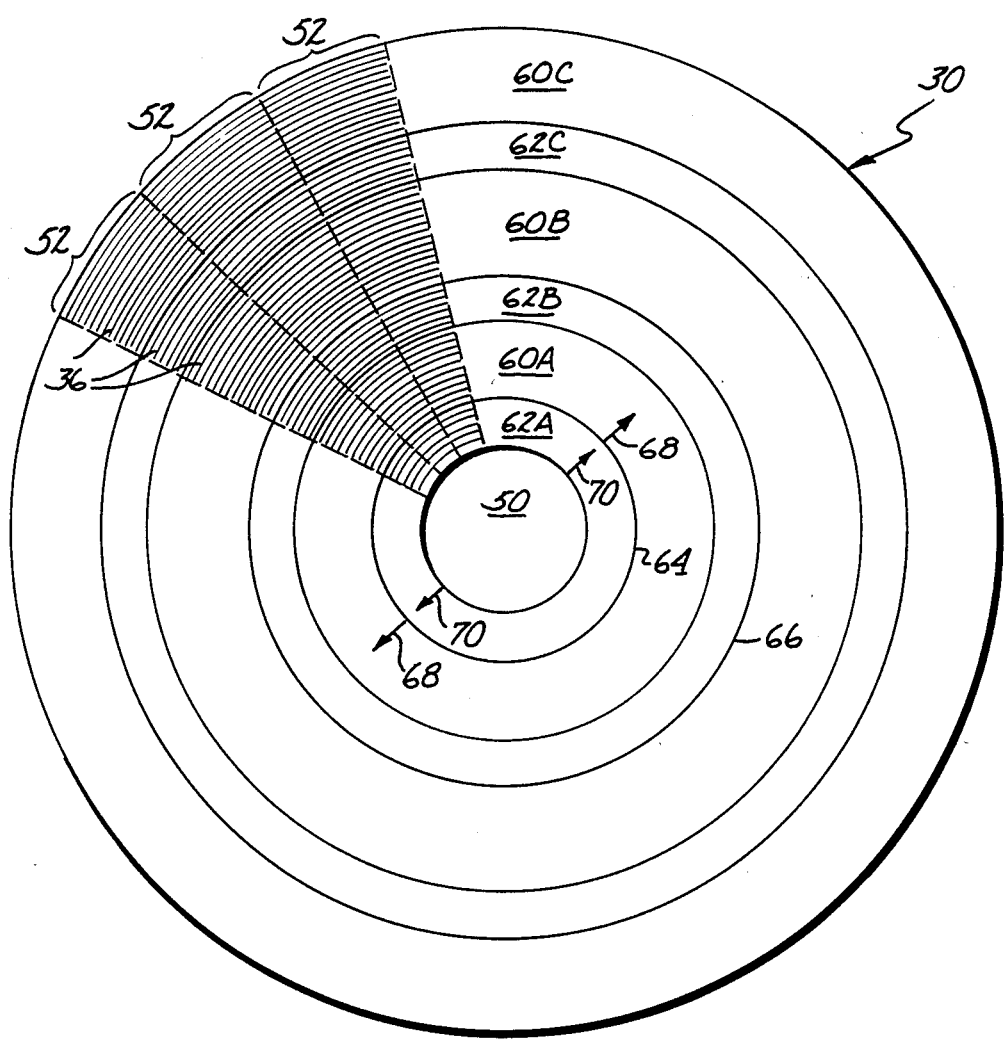
FIG. 3 is a graphic representation of a surface of the optical disk shown in FIG. 2 illustrating locations of information regions and directory regions thereon as assigned by the file management system.

A recording surface of optical disk 30 is illustrated in greater detail in FIG. 3. In one preferred embodiment, optical disk 30 is a 5¼" write once read mostly optical disk which includes 18.7K servo tracks 36 concentrically positioned about a center hub 50. Each servo track 36 is divided into 22 sectors 52 (three sectors 52 of each servo track 36 are shown in FIG. 3.) Each sector 52 of each servo track 36 can store up to 512 bytes of information in one preferred embodiment. Servo tracks 36 are shown only on a portion of optical disk 30 in FIG. 3 for reasons of clarity. Individual sectors 52 on optical disk 30 can be identified or addressed by track and sector or sequentially by sector. The third sector 52 on the second servo track 36, for example, is the same sector as the forty-seventh sector 52. For reference purposes, the first sector 52 on the innermost servo track 36 is typically referred to as the first sector 52.

For purposes of explanation, data being processed by host computer 12 (e.g., data being processed by user programs 14) is referred to throughout the remainder of this specification as "information data." Typically, user programs 14 will be processing groups of information data which are characterized as files. When it is desired to store or write individual files to, or to retrieve or read individual files from optical disk drive 26, user programs 14 will interface with file management system 10 to perform these functions. File management system 10 receives instructions from user program 14 indicating that it is desired to write files of information data to or read files of information data from optical disk drive 26. In response to these instructions, file management system 10 produces command signals which cause controller 28 to produce appropriate tracking and read/write control signals so as to have optical head 38 write the files to or read the files of information data from specific sectors 52 on optical disk 30.

In addition to the information data, file management system 10 produces commands which cause directory data to be written to or read from specific sectors 52 on optical disk 30. Directory data is data which is used by file management system 10 to locate and identify files of information data already written to optical disk 30, and to determine available locations for additional files of information data and directory data. All files of information data written to optical disk 30 therefore have directory data associated therewith written to optical disk 30.

File management system 10 produces command signals which causes information data and directory data to be written onto optical disk 30 in a unique format which is best described with reference to FIG. 3. File management system 10 produces commands which causes files of information data to be written to one of a plurality of information data regions 60A-60C. Directory data associated with the information data written to information data regions 60A-60C is written to one of a plurality of directory data regions 62A-62C. File management system 10 causes information data regions and directory data regions to be dynamically created or assigned on an "as needed" basis.

Directory data associated with each group of one or more new or updated files of information data written to information data regions 60A-60C is preferably written to a directory data region 62A-62C which is adjacent to the information data region 60A-60C. For example, directory region 62A will preferably contain current directory data to groups of one or more new or updated files of information data written to information data region 60A. As is evident from FIG. 3, file management system 10 causes directory data regions 62A-62C and information data regions 60A-60C to be interleaved or alternated with respect to one another on optical disk 30.

File management system 10 preferably causes directory and information data to be written to directory data regions 62A-62C and information data regions 60A-60C, respectively, in the following manner. When a first file of information data is to be written to a clean optical disk 30, one which has not been previously written to, file management system 10 first reserves a directory data region such as 62A of a predetermined size, i.e., a predetermined number of sectors 52, on optical disk 30. As shown in FIG. 3, directory data region 62A is preferably reserved on the innermost servo tracks 36 of optical disk 30. In one preferred embodiment which will be used for purposes of example throughout the remainder of this specification, file management system 10 reserves 66 sectors 52, or three servo tracks 36, for directory region 62A. Ring 64 is used to delineate directory region 62A on FIG. 3, but represents no physical feature of optical disk 30.

After having reserved directory region 62A, file management system 10 causes the first file of information data to be written to an information data region 60A which is adjacent an outer edge of directory region 62A. The writing of the first file of information data will preferably start at the first or next sequential sector 52 following the last sector 52 reserved for use as directory region 62A. Following the above example, file management system 10 will cause the first file of information data to be written starting at the sixty-seventh sector 52. File management system 10 will then cause the writing of the first file of information data to continue on consecutive or adjacent sectors 52 of information data region 60A until all information data of the first file has been written to optical disk 30. If the first file of information data requires one hundred sectors 52, it will occupy the sixty-seventh through one hundred and sixth-sixth sectors 52 of optical disk 30.

After the information data of the first file has been written to information data region 60A, file management system 10 produces commands which cause directory data associated with the first written file of information data to be written onto directory region 62A. Preferably, file management system 10 will cause this directory data to be written to the first available sector 52 in directory data region 62A. Since the previously described file was the first file of information data written to information data region 60A, writing of the directory data associated therewith will be begin at the first sector 52 of the first servo track 36. File management system 10 causes the writing of directory information to continue on consecutive or adjacent sectors 52 until all of the directory data is written. If the directory data requires two sectors 52, it will occupy the first and second sectors 52 of directory region 62A.

A similar procedure is followed when user program 14 requests that another or second group of one or more files of information data be written to optical disk drive 26. File management system 10 will cause the second group of files of information data to be written to information data region 60A starting at a sector 52 following the last sector 52 previously written, or the last sector 52 occupied by the first file of information data. Continuing the example started above, the second group of files of information data will be written to consecutive sectors starting at the one hundred and sixty-seventh sector 2. Directory data associated with this next or second written group of files is then written to consecutive sectors 52 of directory data region 62A beginning at a sector following the last sector 52 previously written with directory data. Following the example started above, directory data for the second group of files will be written to consecutive sectors 52 in directory data region 62A starting at the third sector 52. In the embodiment of file management system 10 described above, information data and directory data are written to information and directory data regions 60A and 62A, respectively, in a manner tending to fill these regions in an outward or radial direction toward an outer edge of disk 30 as indicated by arrows 68 and 70.

The above-described procedure for writing files of information data and directory data associated therewith is repeated for all subsequent files of information data written to optical disk 30 until all reserved sectors 52 within directory data region 62A have been written with directory data. In other words, information data region 60A is allowed to grow to any required size, until the directory data associated therewith fills directory data region 62A (e.g., directory data is written to the sixty-sixth sector 52 in the examples used above). In the embodiment shown in FIG. 3, ring 66 delineates the last servo track 36 (for purposes of example, the two-thousand two hundredth sector 52) of information data region 60A to which information data was written before directory data region 62A was filled.

Once a previous directory region such as 62A is filled, all of the above described procedures are repeated, preferably, in the next available free space on optical disk 30. File management system 10 will cause another directory region such as second directory region 62B to be reserved adjacent to an end or outer edge of the previous information data region, such as information data region 60A. File management system 10 will preferably cause directory data region 62B to have the same size as directory data region 62A. Following examples used above, directory data region 62B will occupy the two-thousand two-hundred and first through two-thousand two-hundred and sixth-sixth sectors 52. Ring 66 in FIG. 3 delineates an outer boundary of reserved directory data region 62B. File management system 10 then causes any following fields of information data to be written to a next or second information data region 60B starting at a location adjacent the outer boundary of directory data region 62B (e.g., at the two-thousand two-hundred and sixth-seventh sector 52).

File management system 10 then commands information and directory data to be written to information and directory data regions 60B and 62B, respectively, with information data region 60B expanding radially outward on optical disk 30 as necessitated by the amount of volume of information data written thereto, until directory region 62B is filled. All of the above procedures are then repeated continuously until optical disk 30 is completely filled with information and directory data. In the embodiment shown in FIG. 3, optical disk 30 is filled by information data region 60C and its associated directory data region 62C.

Although only three information data regions 60A–60C and three corresponding directory data regions 62A–62C are shown in FIG. 3, it is evident that there could be many more of these regions. Factors contributing to the number of information data regions 60A–60C and directory data regions 62A–62C include the size of the reserved directory regions 60A–62C, and the size and number of the files of information data being written to information data regions 60A–60C.

Figure 4:
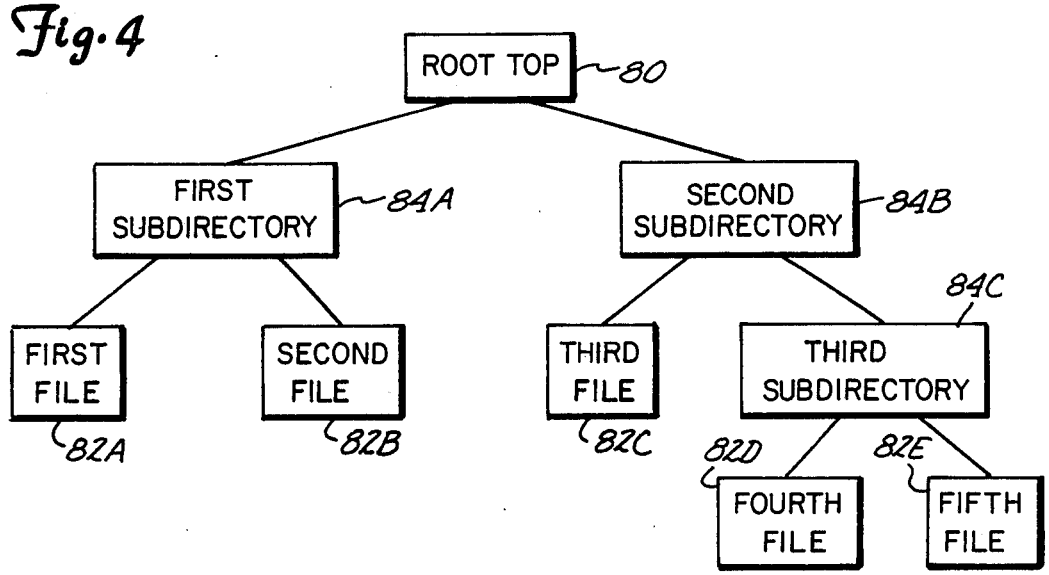
FIG. 4 is a graphic representation of a root, or the tree structure of directory data, created by the file management system, to files of information data written to the optical disk.

File management system 10 causes directory information to be written into directory data regions 62A–62C in a tree structure. This tree structure is illustrated generally in FIG. 4, and is characterized as a "root" since its contains information pointing to locations of all files of information data written to information data regions 60A–60C. The tree structure of directory data written in accordance with the present invention always begins at or extends from a designated root identifier or reference point 80 such as root top. As shown in FIG. 4, all files 82A–82E of information data are grouped into or associated with one of subdirectories 84A–84C. First file 82A and second file 82B, for example, are contained within or "written" to first subdirectory 84A. Third file 82C on the other hand, is an element of second subdirectory 84B. Any subdirectory 84A–84C can also have one or more subdirectories associated therewith. Third subdirectory 84C, for example, is a subdirectory of second subdirectory 84B. In essence, subdirectories 84A–84C are just names or identifiers used to identify a grouping of files 82A–82E.

Figure 5:
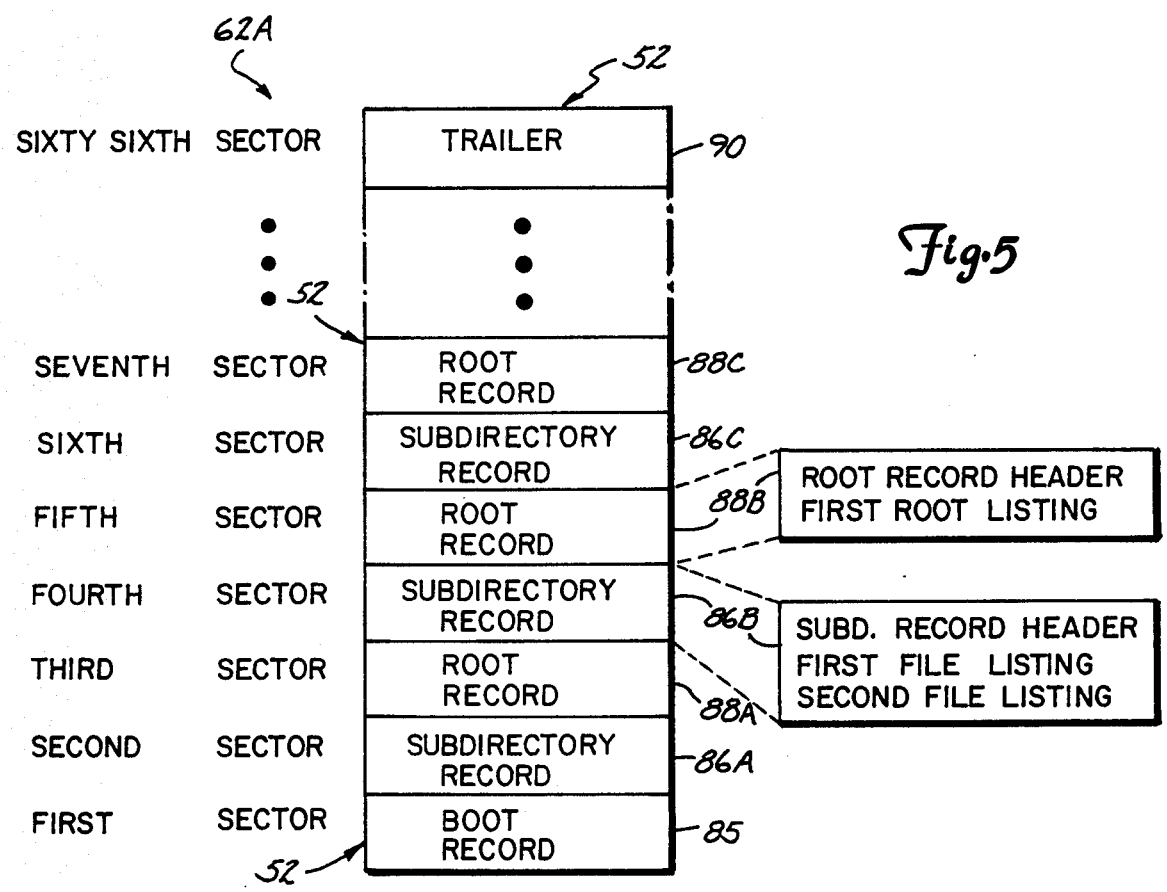
FIG. 5 is a graphic representation of a direction region on the optical disk illustrating directory data including a boot record, subdirectory records, root records, and a trailer, caused to be written thereto by the file management system.

A typical directory data region such as 62A which is representative of directory regions 62A–62C is illustrated generally in FIG. 5. Following the example used above, directory region 62A is formed by sixty-six reserved sectors 52. As illustrated in FIG. 5, a first sector 52 of directory region 62A is written with a boot record 85. For each group of one or more files of information data subsequently written to information data region 60A, file management system 10 causes an associated subdirectory record 86A–86C and a root record 88A–88C to be written to directory region 62A. Each subdirectory record 86A–86C, when written, is a current record of the location within information data regions 60A–60C of all files 82A–82E whjich are elements thereof. Each root record, when written, is a current record of the location within directory data regions 62A–62C of all "current" subdirectory records 86A–86C. This procedure is repeated for each new or updated group of one or more files of information data written to information regions 60A until directory data region 62A is nearly filled. File management system 10 then causes a trailer 90 to be written to a last (e.g, sixth-sixth) sector 52 of directory data region 62A.

The primary function of boot record 85 is to identify the position or location occupied by the first directory data region, such as 62A, written to optical disk 30. To this end, file management system 10 causes information including the starting servo track 36, the starting sector 52, the ending servo track 36, and the ending sector 52 for directory region 62A to be written to boot record 85 as indicated in FIG. 6. Other information which can be written to boot record 85 includes the time and date optical disk 30 was initialized, a volume name of the optical disk, the total number of servo tracks 36 on optical disk 30, and the size or number of bytes of sectors 52.

As previously described, each time a group of one or more new files 82A–82E of information data is written to optical disk 30, file management system 10 causes a subdirectory record 86A–86C to be written to the next available sector 42 of directory data region 62A. As illustrated by subdirectory record 86B which is representative of subdirectory records 86A–86C, each subdirectory record includes a subdirectory record header and a listing of each file of information data which is an element of the subdirectory to which the most recent or current group of one or more files was just written. The primary function of each subdirectory record 86A-86C is to identify the starting location or address within information data regions 60A-60C at which each file 82A-82E of information data of the subdirectory 84A-84C can be found. To this end, information included within the file record header and each file listing of subdirectory records 86A-86C is illustrated in FIGS. 7 and 8.

As shown in FIG. 7, the subdirectory record header includes a subdirectory record header identifier which is a unique code recognized by file management system 10 as indicating a subdirectory record header. The subdirectory record header also includes the name of the subdirectory 84A-84C to which the file 82A-82E of information data just written was grouped or associated. Pointers or "high water marks" indicating the next available sector 42 for information data and the next available sector 42 for directory data are also commanded to be written to the subdirectory record header by file management system 10. Other information such as the time and date the subdirectory header was written to optical disk 30 and also be included within the subdirectory record header.

As shown in FIG. 8, each file listing includes a file listing identifier which is a code recognized by file management system 10 as indicating a file listing. The file listing also includes the name given to the file 82A-82E of information data, the starting sector 52 of the file, and the length of the file. The file listing therefore contains information pointing to the address or location of the file 82A-82E of information data within one of information regions 62A-62C of optical disk 30. This information is used by file management system 10 when it is desired to read the information data of a particular file 82A-82E. Other information including the time and date the file 82A-82E was written to optical disk 30, or other file attributes, can also be included within the file listing.

The above description of a subdirectory record is illustrated with reference to the directory structure shown in FIG. 4, and directory region 62A shown in FIG. 5. As shown in FIG. 4, first file 82A and second file 82B were written to first subdirectory 84A. Assuming files 82A and 82B were the first and second files of information data written to optical disk 30, they will have been written to information data region 60A. For purposes of this example, it will be assumed that first file 82A was written to and occupies the sixty-seventh through one-hundred and sixty-sixth sectors 52 of information data region 60A. Subdirectory record 86A and root record 88A for first file 82A are written to the second and third sectors 52 in directory data region 62A, respectively. Subsequently, second file 82B was written to first subdirectory 84A. Second file 82B is assumed to occupy the one-hundred and sixty-seventh through one-thousandth sectors 52 of information data region 60A. Following the writing of second file 82B, file management system 10 causes subdirectory record 86B to be written to fourth sector 42 in directory data region 62A. Since second file 82B was the second file within first subdirectory 84A, subdirectory record 86B will include a subdirectory record heading and a listing for first file 82 and second file 82B.

The subdirectory record header of subdirectory record 86B will have "first subdirectory" identified as the subdirectory name, one-thousand and first sector 52 as the next available sector for information data, and fifth sector 52 as the next available sector for directory data. The first file listing, which is also written to fourth sector 52, will identify "first file" as the file name, sixty-seventh sector 52 as the starting sector of the file, and one hundred sectors 52 as to length of the file. The second file listing, that referring to just written second file 82B, will identify "second file" as the file name, one hundred and sixty-seventh sector 52 as the starting sector, and eight-hundred thirty-three sectors 52 as the length of the file.

After writing the subdirectory record 86B, file management system 10 will write root record 88B to the fifth sector 52 as shown in FIG. 5. Root record 88B, which is representative of root records 88A-88C, contains a root record header and a root listing for each subdirectory 84A-84C which branches from reference point 80, or root top. Each root record 88A-88C therefore identifies the location within directory data regions 62A-62C of the subdirectory records 86A-86C for each subdirectory 84A-84C to which files 82A-82E of information data have been written to optical disk 30. Since each root record 88A-88C contains pointers to all current subdirectory records 86A-86C, only the most current or rently written root record 88A-88C need be accessed to determine the location of any current file 82A-82E.

Information contained within the root record header and root listings are illustrated in FIGS. 9 and 10, respectively. As shown in FIG. 9, each root record header includes a root record header identifier which is a code which uniquely identifies a root record header, the root name, the next available sector for information data, and the next available sector for directory data. Other information such as the time and data that the root record header was written to optical disk 30 can also be included.

Each root listing (FIG. 10) includes a root listing identifier which uniquely identifies the root listing to file management system 10. Also included is data identifying the subdirectory name, the starting sector of the subdirectory record, and the length of the subdirectory record.

Returning to the example used earlier, root record 88B for second file 82B will be written to the fifth sector 52 of directory data region 62A. Root top (i.e., identifier 80) is identified as the name of this root in the root record header. The next available sector for information data is the one thousand and first sector 52, and the next available sector 52 for directory data is the sixth sector 52. Since first and second files 82A and 82B, respectively, were both written to first subdirectory 84A, which at the time is the only subdirectory within directory root top, there will be only one root listing. This root listing will include data identifying first subdirectory 84A as the subdirectory name, fourth sector 52 as the starting sector of the subdirectory record, and one sector 52 as the length of the subdirectory record.

Continuing further with the example used above, the next file of information data written to optical disk 30 will be third file 82C. As illustrated in FIG. 4, third file 82C is written to second subdirectory 84B. Since second file 82B ended at the one-thousandth sector 52, file management system 10 will cause third file 82C to be written to information data region 60A starting at the one-thousand and first sector 52. Assuming third file 3 is one thousand sectors 52 long, it will occupy the one thousand and first through two thousandth sectors 52 in information data region 60A.

File management system 10 will then write a subdirectory record 86C to the sixth sector 52 in directory data region 62A. The file record header of file record 86C will identify second subdirectory 84B as the subdirectory name, the two thousand and first sector 52 as the next available sector for information data, and the seventh sector 52 as the next available sector for directory data. Since third file 82C was the first file written to second subdirectory 84B, there will only be one file listing in subdirectory record 86C. This file listing will identify the third file 82C as the file name, the one-thousand and first sector 52 as the starting sector of file 82C, and one thousand sectors 52 as the length of third file 82C.

File management system 10 will then cause root record 88C to be written in seventh sector 52. The root record header will have identifier 80, or root top, identified as the root name, the two thousand and first sector 52 identified as the next available sector for information data, and the eighth sector 52 identified as the next available sector for directory data. Since third file 82C was written to second subdirectory 84B, there are now two subdirectories 84A and 84B within the root or directory structure shown in FIG. 4. Root record 88C will therefore include two root listings. The first root listing identifies first subdirectory 84A as the subdirectory name, fourth sector 52 as the starting sector of subdirectory record 86B, and one sector 52 as the length of subdirectory record 86B. A second root listing will identify second subdirectory 84B as the subdirectory name, sixth sector 52 as the starting sector of subdirectory record 86C, and one sector 52 as the length of subdirectory record 86C. The procedures described above provide a basis for extending the root or directory structure shown in FIG. 4 in any desired manner.

As previously discussed, file management system 10 causes a trailer to be written to the last sector of reserved directory regions 62A-62C. Trailer 90 is written to the sixty-sixth sector 52 of directory data region 62A shown in FIG. 5. FIG. 11 illustrates the information which is written to trailer 90 which is representative of trailers in all directory regions 62A-62C. Trailer 90 can include a trailer identifier which is a code uniquely identifying the trailer to file management system 10, takes the starting sector 52 of directory region 62A, and the starting sector 52 of the next directory region (e.g., region 62B). Trailers such as 90 therefore provide information to file management system 10 which is used to locate the beginning of the current directory data region 62A-62C, and the beginning of the next sequential directory data region 62A-62C. In essence, the trailers such as 90 are chaining elements which provide information linking directory regions 62A-62C to each other.

To read files 82A-82E of information dat written to optical disk 30 in accordance with the above-described technique, file management system 10 must first find the most current, or last written, root record 88A-88C from directory regions 62A-62C. The first step in this process is to determine the most current directory information region 62A-62C, or that directory regions 62A-62C to which directory information was last written. This operation is performed utilizing the information contained within the boot record 85 and trailers such as 90 of each directory data regions 62A-62C. File management system 10 preferably begins the search by reading information from the boot record 85 of the innermost directory region 62A-62C on optical disk 30.

Utilizing the information in boot record 85, file management system 10 determines the location of the last sector 52 of the innermost directory region 62A-62C. File management system 10 then causes information to be read from the last sector 52 of the innermost directory region 62A-62C. If the innermost directory region 62A-62C has been filled, file management system 10 will have written a trailer such as 90 thereto, and the information in trailer 90 will point to the starting sector of the next directory region (e.g., region 62B). The above described procedure is then repeated by chaining through directory regions 62A-62C until a directory data region 62A-62C is found which does not have information written to its last sector 52, or trailer.

After finding the most current directory region 62A-62C in the above described manner, file management system 10 preferably performs a binary search to determine the location of the last root record 88A-88C written to the directory data region 62A-62C. After locating the most recent root record 88A-88C, file management system 10 searches through the root listings contained therein until it finds the name of the subdirectory 84A-84C of which the file 82A-82E is an element. This root listing will then identify the starting sector 52 of the subdirectory record 86A-86C of the subdirectory 84A-84C. File management system 10 then searches through the subdirectory record 86A-86C which was "pointed" to by the root listing, until it finds the file listing of the file 82A-82E it is desired to read. This file listing contains information or pointers to a starting sector 52 of the file 82A-82E within whatever information data region 60A-60C it is located. File management system 10 then produces command signals causing optical head 28 to be driven to that precise sector 52, and to begin reading the information data written thereto.

It is evident from the above description that file management 10 of the present invention has many desirable features. Since directory regions 62A-62C and information regions 60A-60C are interleaved on optical disk 30, directryy data in directory data regions 62A-62C will often be physically close to the information data contained within information data regions 60A-60C with which it is associated. The seek time, or the time it takes to drive optical head 28 from the directory data region 62A-62C to the information data regions 60A-60C in which the information data is located is reduced. As a result, the time it takes file management system 10 to access a desired file 82A-82E as commanded by user program 14 through operating system 16 is also reduced.

The technique by which directory data is written to directory data region 62A-62C also lends itself well to the characteristics of optical disks, including write once read mostly optical disks. The subdirectory records 86A-86C written to directory data regions 62A-62C each time one or more files of new information data is written to one of the information data regions 60A-60C need only contain file listings for those files 82A-82E in the subdirectory 84A-84C to which the file or group of files was written. Since file listings for all subdirectories 84A-84C currently written to optical disk 30 need not be updated each time a new file is written, space within directory data regions 62A-62C is used very efficiently. It is also possible to retrieve previous versions of a file 82A-82E, even though that file may have been updated.

In other words, any file written to optical disk 30 can be later retrieved.

Although the present invention has been described with reference to preferred embodiments, workers skilled in the art will recognize that changes may be made in form and detail without departing from the spirit and scope of the invention. For instance, although only one file was written to a subdirectory at a time in the examples used, it must be understood that a group of files could also be written to subdirectory, and only one subdirectory and root record would be needed for directory date thereto. Directory and information data regions need not start at an innermost portion on the optical disk either. They could begin at any physical location, and expand either inward or outward. The disk could also be partitioned, and have more than one tree directory structures contained thereon. The tree directory structure is not dependent upon the preferred technique by which directory and information data regions are assigned, either.

What is claimed is:

1. A method for writing files of information data and directory data to an optical disk, including:
 reserving a first directory region;
 writing one or more files of information data to a first information region;
 writing directory data associated with the files of information data written to the first information data region to the first directory region;
 reserving a second directory region which is spaced from the first directory region by an information region;
 writing one or more files of information data to a second information region; and
 writing directory data associated with the files of information data written to the second information region to the second directory region.

2. The method of claim 1 wherein reserving a first directory region includes reserving a first directory region having a predetermined number of consecutive addressed sectors.

3. The method of claim 2 wherein writing files of information data to the first information region includes writing files of information data to consecutive addressed sectors of the first information region adjacent the first directory region.

4. The method of claim 3 wherein writing files of information data to the first information region includes writing files of information data to consecutive addressed sectors of the first information region until the first directory region is filled with directory data.

5. The method of claim 4 wherein reserving the second directory region includes reserving a second directory region having a predetermined number of consecutive addressed sectors adjacent to the first information region.

6. The method of claim 5 wherein writing files of information data to the second information region includes writing files of information data to consecutive addressed sectors of the second information region adjacent the second directory region.

7. The method of claim 6 wherein writing files of information data to the second information region includes writing files of information data to consecutive addressed sectors of the second information region until the second directory region is filled with directory data.

8. The method of claim 7 and further including reserving a third directory region having a predetermined number of consecutive addressed sectors adjacent the second information region.

9. The method of claim 1 and further including associating each file of information data written to an information region with a subdirectory.

10. The method of claim 9 wherein writing directory data to the second directory region includes writing a current subdirectory record representative of the location within an information region of each file of information data associated with the subdirectory to which the just written group of one or more files of information data was associated, after each group of one or more files of information data is written to the second information region.

11. The method of claim 10 wherein writing a current subdirectory record includes writing one or more file listings, each including data representative of a starting location within an information region of a file of information data associated with the subdirectory to which the just written group of one or more files of information data is associated.

12. The method of claim 11 wherein writing a file listing further includes writing file listing identifier data.

13. The method of claim 10 wherein writing a current subdirectory record further includes writing a subdirectory record header including data representative of the subdirectory name.

14. The method of claim 13 wherein writing a subdirectory record header further includes writing data representative of a next available location for information data.

15. The method of claim 13 wherein writing a subdirectory record header further includes writing data representative of a next available location for directory data.

16. The method of claim 13 wherein writing a subdirectory record header further includes writing subdirectory record header identifier data.

17. The method of claim 10 wherein writing directory data to the second directory region further includes writing a current root record of data representative of a location within a directory region of each current subdirectory record.

18. The method of claim 17 wherein writing a current root recorded includes writing one or more root listings, each including data representative of a starting location within a directory region of a current subdirectory record.

19. The method of claim 18 wherein writing a root listing further includes writing root listing identifier data.

20. The method of claim 19 wherein writing a root listing further includes writing data representative of a name of the subdirectory.

21. The method of claim 17 wherein writing directory data further includes writing a root record header including data representative of a next available location for information data.

22. The method of 21 wherein writing a root record header further includes writing data representative of a next available location for directory data.

23. The method of claim 21 wherein writing a root record header further includes writing root record header identifier data.

24. The method of claim 1 wherein writing directory data to the first directory region includes writing a boot record including data representative of a starting location of the first directory region.

25. The method of claim 24 wherein writing a boot record further includes writing data representative of an ending location of the first directory region.

26. The method of claim 1 wherein writing directory data to the first directory region further includes writing a trailer including data representative of a starting location of the second directory region.

27. The method of claim 26 wherein writing the trailer further includes writing trailer identifier data.

28. The method of claim 1 and further including reading files of information data from the optical disk.

29. A method for writing data to an optical disk of an optical data storage system in which files of information data are written to indexed locations of an information data region and directory data is written to indexed locations of a directory data region, including:
   associating each file of information data with a subdirectory;
   writing a group of one or more files of information data to an information region;
   writing a current subdirectory record including data representative of a location, within an information region, of each file of information data associated with the subdirectory to which the just written group of files are associated, after the group of files are written;
   writing a current root record including data representative of a location within a directory data region of each current subdirectory record; and
   repeating the above steps of each group of one or more files of information data to be written to the optical disk.

30. The method of claim 29 wherein writing a current subdirectory record includes writing one or more file listings, each including data representative of a location in an information region of a file of information data associated with the subdirectory to which the just-written group of files are associated.

31. The method of claim 30 wherein writing a file listing includes writing data representative of a starting location within an information region of a file of data association with the subdirectory with which the just written group of files are associated.

32. The method of claim 31 wherein writing a file listing further includes writing file listing identifier data.

33. The method of claim 29 wherein writing a current subdirectory record includes writing a subdirectory record header including data representative of the subdirectory name.

34. The method of claim 33 wherein writing a subdirectory record header further includes writing data representative of a next available location for information data.

35. The method of claim 33 wherein writing a subdirectory record header further includes writing data representative of a next available location for directory data.

36. The method of claim 33 wherein writing a subdirectory record header further includes writing subdirectory record header identifier data.

37. The method fo claim 29 wherein writing a root record includes writing one or more root listings, each including data representative of a location within a directory data region of a current subdirectory record.

38. The method of claim 37 wherein writing a root listing includes writing data representative of a starting location within a directory region of a current subdirectory record.

39. The method of claim 30 wherein writing a root listing further includes writing root listing identifier data.

40. The method of claim 39 wherein writing a root listing further includes writing data representative of the subdirectory name.

41. The method of claim 29 wherein writing a root record includes writing a root record header including data representative of a next available location for information data.

42. The method of claim 41 wherein writing a root record header further includes writing data representative of a next available location for directory data.

43. The method of claim 41 wherein writing a root record header further includes writing root record header identifier data.

44. The method of claim 29 and further including reading files of information data from the optical disk.

45. A method for writing files of information data and directory data to an optical disk of the type having a plurality of consecutive addressed sectors, including:
   associating each file of information data to be written to the disk with a subdirectory;
   reserving a first directory region on the disk having a predetermined number of consecutive sectors;
   writing a group of one or more files of information data to consecutive sectors of a first information region on the disk adjacent the first directory region;
   writing, to consecutive sectors of the first directory region, a current subdirectory record including data representative of a location within an information region of each file of information data associated with the subdirectory to which the just-written group of files are associated;
   writing, to consecutive sectors in the first directory region, a current root record including data representative of a location within a directory region of each current subdirectory record;
   repeating the steps of writing files to the first information region, writing a current subdirectory record to the first directory region, and writing a current root record to the first directory region, until the first directory region is filled with directory data;
   reserving a second directory region having a predetermined number of consecutive sectors adjacent the first information region;
   writing a group of one or more files of information data to consecutive sectors of a second information region adjacent the second directory region;
   writing, to consecutive sectors of the second directory region, a current subdirectory record including data representative of a location within an information region of each file of information data associated with the subdirectory to which the just-written group of files are associated;
   writing, to consecutive sectors of the second directory directory region, a current root record including data representative of a location within a directory region of each current subdirectory record;
   repeating the steps of writing files to the second information region, writing a current subdirectory record to the second directory region, and writing a current root record to the second directory region, until the second directory region is filled with directory data; and
   repeating the above steps in third and subsequent directory regions and information regions for additional groups of one or more files of information data to be written to the optical disk.

46. The method of claim 45 wherein writing a current subdirectory record includes writing one or more file listings, each including data representative of a starting location in an information region of a file of information data associated with the subdirectory to which the just-written group of files are associated.

47. The method of claim 46 wherein writing a file listing further includes writing file listing identifier data.

48. The method of claim 45 wherein writing a current subdirectory record includes writing a subdirectory record header including data representative of the subdirectory name.

49. The method of claim 48 wherein writing a subdirectory record header further includes writing data representative of a next-available location for directory data.

50. The method of claim 49 wherein writing a subdirectory record header further includes writing subdirectory record header identifier data.

51. The method of claim 45 wherein writing a root record includes writing one or more root listings, each including data representative of a starting location within a directory data region of a current subdirectory record.

52. The method of claim 51 wherein writing a root listing further includes writing root listing identifier data.

53. The method of claim 52 wherein writing a root listing further includes writing data representative of the subdirectory name.

54. The method of claim 45 wherein writing a root record includes writing a root record header including data representative of a next available sector for information data.

55. The method of claim 54 wherein writing a root record header further includes writing data representative of a nextavailable location for directory data.

56. The method of claim 55 wherein writing a root record header further includes writing root record header identifier data.

57. The method of claim 45 wherein writing directory data to a directory region further includes writing a boot record including data representative of an ending location of the directory region.

58. The method of claim 57 wherein writing a boot record further includes writing data representative of a starting location of the directory region.

59. The method of claim 45 wherein writing directory data to a directory region further includes writing a trailer including data representative of a starting location of a next directory region.

60. The method of claim 59 wherein writing the trailer further includes writing trailer identifier data.

61. The method of claim 45 and further including reading files of information data from the optical disk.

62. For use in conjunction with an optical data storage system of the type in which files of information data written to an optical disk are associated with a subdirectory and written to one of a plurality of information regions radially interleaved on the disk with a plurality of directory regions, the directory regions having, for each group of one or more just-written files, a subdirectory record including data representative of a location within an information region of each file of information data associated with the subdirectory to which the just-written group of files was associated, a current root record including data representative of a location within a directory region of each current subdirectory record, and ending with a trailer including data representative of a beginning location of a next directory region, a method of accessing and reading a desired file of information data, including:
  locating a most current directory region;
  locating a most recently written root record in the most current directory region;
  searching the root record and identifying data representative of the location of the subdirectory record of the subdirectory with which the desired file is associated;
  accessing the subdirectory record as a function of the data representative of its location identified while searching the root record;
  searching the subdirectory record and identifying data representative of the location of the desired file;
  accessing the file as a function of the data representative of its location identified while searching the subdirectory record; and
  reading the file of data.

63. The method of claim 62 wherein locating the most current directory region includes chaining through the directory regions as a function of the data representative of the next directory region in the trailers until a directory region is located which does not have a trailer.

64. The method of claim 62 wherein locating the most recently written root record includes performing a binary search through the most current directory region.

* * * * *

UNITED STATES PATENT AND TRADEMARK OFFICE
CERTIFICATE OF CORRECTION

PATENT NO. : 4,791,623

DATED : December 13, 1988

INVENTOR(S) : Charles E. Deiotte

It is certified that error appears in the above-identified patent and that said Letters Patent is hereby corrected as shown below:

Column 14, Line 45, delete "recorded," and insert "record"

Column 15, Line 42, delete "association" and insert "associated"

Column 15, Line 61, delete "fo" and insert "of"

Column 16, Line 1, delete "claim 30" and insert "claim 38"

Column 17, Line 39, delete "nextavailable" and insert "next-available"

Column 18, Line 44, delete "the" and insert "a"

In the REFERENCES CITED Section, under "Other Publications" add the following:

Title Pages and Pages 266-273 of book entitled *Microprocessors and Programmed Logic* by Kenneth L. Short.

Signed and Sealed this

Twentieth Day of June, 1989

Attest:

DONALD J. QUIGG

Attesting Officer

Commissioner of Patents and Trademarks